Patented Jan. 7, 1941

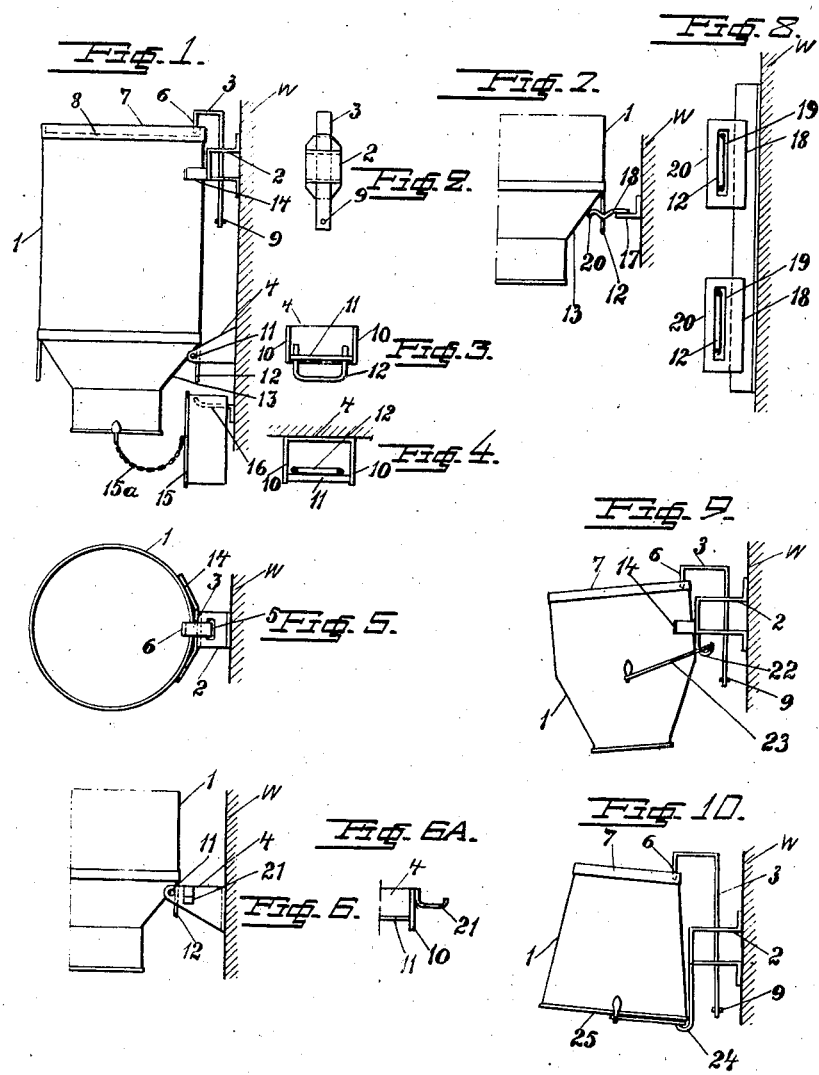

2,227,886

UNITED STATES PATENT OFFICE 2,227,886

SUSPENSION DEVICE FOR MILK VESSELS AND THE LIKE

Karl Johan Jungholm, Stockholm, Sweden

Application May 3, 1938, Serial No. 205,834
In Sweden May 8, 1937

2 Claims. (Cl. 248—311)

In order to obtain a favorable milk-hygiene it is of great importance that the vessels, which are used at the milking or for the transport and the keeping of milk, be effectively dried after having been cleaned after use. For this purpose the vessels ought to be placed on separate supports or holders in an up and down position, so that the air gets access to the interior of the vessels and moisture retained in the vessels is able to run off.

Since generally the vessels are placed on the holders and removed therefrom several times every day, the holder ought to be so constructed that the application and the removal of the vessels can be performed as easily as possible. Further, the holder ought to be so arranged that constructional details normally belonging to the vessels can operate with the holder, so that separate mountings or fastenings on the vessels be not required for the said purpose.

The present invention relates to a suspension device for milk-vessels and the like made according to the above points of view and comprising essentially at least one bracket adapted to be secured to a wall or the like and having a slidable hook member adapted to engage the bottom hoop of the vessel, and means for suspending the vessel at a point below said hoop of the up and down turned vessel.

The accompanying drawing illustrates some embodiments of a suspension device according to the invention.

Fig. 1 is a side view of a suspension device comprising two wall brackets and having a transport vessel for milk hanged thereto. Fig. 2 is a front view of the upper bracket and Fig. 3 a similar view of the lower bracket. Fig. 4 is a top view of said lower bracket, and Fig. 5 is a similar view of the upper bracket. Fig. 6 is a side view and Fig. 6A a front view of a modified arrangement of the lower bracket and a part of the milk-vessel. Fig. 7 is a side view and Fig. 8 a top view, respectively, of a further modification of the lower bracket, part of the milk-vessel being shown in Fig. 7. Figs. 9 and 10 show different embodiments of a single-bracket arrangement viewed from the side.

Referring to Figs. 1 to 5, 1 designates an ordinary milk-vessel commonly used for transport of the milk and 15 is the lid thereof having an ordinary chain connection 15a with the vessel proper. The suspension device comprises an upper bracket 2 and a lower bracket 4, secured in any convenient manner to the wall W. The upper bracket 2 is U-shaped and slidable up and down in slots 5, Fig. 5, in the two leg members thereof is a hook member 3 adapted to engage with its bent end 6 at the inside of the bottom hoop 7 of the vessel 1, as visible from Fig. 1, said hoop projecting to some degree from the bottom 8 of the vessel as usual. In order to prevent withdrawal of the hook member 3, 6 from the bracket 2 said member is provided with a retaining pin 9 at its lower end. Projecting laterally from the bracket 2 are somewhat bent arms 14 adapted to form lateral supports for the vessel 1, as best visible from Fig. 5.

The lower bracket 4 has outwardly projecting side pieces 10, between which there is placed a cross pin or rod 11 forming a suspending device for the vessel 1 and adapted to enter between one of the ordinary handles 12 and the bevelled part 13 of the vessel, as clearly shown in Figs. 1, 3 and 4.

The distance between the side pieces 10 is but slightly greater than the width of the handle 12 and will thus form an effective guidance for the lower part of the up and down turned vessel in the lateral direction.

The lid 15 of the vessel is hanged on a hook 16 or the like secured to the wall W. If desired, said hook may instead be secured to the bracket 4, as shown at 21 in Figs. 6 and 6A.

Fig. 6 shows the lower bracket 4 placed in a manner somewhat different from that one shown in Fig. 1.

According to Figs. 1 to 6 it is presumed that the brackets for each vessel are arranged wholly independent of the brackets for the other vessels.

Figs. 7 and 8 show an arrangement, in which the lower (suspending) brackets for two (or more) vessels are placed on a common supporting member. Here, the said member consists of an L-beam 17 running horizontally and secured to the wall W in any suitable manner. Secured to the said beam is a number of plates 18 having partly a curved profile and having further longitudinal slots 19 adapted to be engaged by one of the handles 12 of the vessel, the bevelled part 13 of which rests against the curved end 20 of the plate, as seen in Fig. 7. If desired, the plates 18 may be made integral with the beam.

Figs. 9 and 10 show single-bracket arrangements, the lower brackets according to Figs. 1 to 8 being dispensed with. The upper brackets 2 are of the same construction as that one shown in Figs. 1, 2 and 5 and have hook members 3, 6 slidable in them.

According to Fig. 9, a hook 22 is firmly secured to the bracket 2, said hook forming the suspension member proper and being adapted to receive the handle 23 of the vessel 1, the slidable hook member 3, 6 engaging at the inside of the bottom hoop 7 of the vessel and side supporting arms 14 being secured to the bracket, as described above with reference to Figs. 1 to 5.

According to Fig. 10, a hook 24 similar to the hook 22 according to Fig. 9 is firmly secured to the bracket 2, said first mentioned hook being adapted to grasp around the rim 25 of the up and down turned vessel 1. In Fig. 10 no side supporting arms are shown, and in certain cases depending on the shape of the vessel such arms may be dispensed with also in the embodiments shown in Figs. 1 to 5 and 9, respectively.

As visible from Figs. 1, 9 and 10, the bracket 2 is of such shape that ample space is provided between the wall W and the vessel 1, so that the slidable hook member 3 will be conveniently accessible below the bracket when applying or removing the vessel.

Obviously, the invention is not limited to the constructional forms of the several details shown in the drawing, but may be varied with respect to the construction of the vessels or other practical circumstances.

What I claim is:

1. A suspension device for milk vessels and the like, comprising an upper bracket adapted to be secured to a wall or the like, a hook member slidable up and down in said bracket and adapted to engage the bottom hoop of an upside down turned vessel, and a lower bracket also adapted to be secured to a wall or the like below said upper bracket and comprising outwardly projecting side pieces adapted to receive an ordinary handle of the vessel to form a lateral guidance for said handle and having a cross pin secured to them adapted to engage the space between said handle and the vessel proper so as to suspend the vessel.

2. A suspension device for milk vessels and the like, comprising an upper U-shaped bracket adapted to be secured to a wall or the like and having apertures in its horizontally directed legs, a hook member slidable up and down in said apertures and adapted to engage the bottom hoop of an upside down turned vessel, and a lower bracket also adapted to be secured to a wall or the like below said upper bracket and comprising outwardly projecting side pieces adapted to receive an ordinary handle of the vessel to form lateral guidance for said handle and having a cross pin secured to them adapted to engage the space between said handle and the vessel proper so as to suspend the vessel.

KARL JOHAN JUNGHOLM.